United States Patent [19]
Lowry

[11] Patent Number: 6,128,617
[45] Date of Patent: Oct. 3, 2000

[54] DATA DISPLAY SOFTWARE WITH ACTIONS AND LINKS INTEGRATED WITH INFORMATION

[75] Inventor: David D. Lowry, Medford, Oreg.

[73] Assignee: Lowry Software, Incorporated, Medford, Oreg.

[21] Appl. No.: 08/977,368

[22] Filed: Nov. 24, 1997

[51] Int. Cl.[7] .................................................. G06F 17/30
[52] U.S. Cl. .............................. 707/100; 707/1; 707/514; 345/356; 345/357
[58] Field of Search .............................. 707/514, 1, 100, 707/103, 506; 345/353, 356, 357

[56] References Cited

U.S. PATENT DOCUMENTS

| | | | |
|---|---|---|---|
| 4,611,298 | 9/1986 | Schuldt | 707/1 |
| 4,831,543 | 5/1989 | Mastellone | 364/489 |
| 5,307,484 | 4/1994 | Baker et al. | 395/600 |
| 5,388,196 | 2/1995 | Pajak et al. | 395/153 |
| 5,442,784 | 8/1995 | Powers et al. | 395/600 |
| 5,568,640 | 10/1996 | Nishiyama et al. | 707/1 |
| 5,630,125 | 5/1997 | Zellweger | 707/103 |
| 5,634,021 | 5/1997 | Rosenberg et al. | 345/353 |
| 5,652,884 | 7/1997 | Palevich | 395/651 |
| 5,694,608 | 12/1997 | Shostak | 707/506 |
| 5,721,910 | 2/1998 | Unger et al. | 707/100 |
| 5,809,497 | 9/1998 | Freund et al. | 707/2 |
| 5,877,766 | 3/1999 | Bates et al. | 345/357 |
| 5,918,225 | 6/1999 | White et al. | 707/3 |
| 6,047,332 | 3/1999 | Viswanathan et al. | 709/245 |

OTHER PUBLICATIONS

Zuge, Yue and Gracia–Molina, Hector, "Graph Structured Views and Their Incremental Maintenance," IEEE Conference, pp. 116–125, Feb. 23, 1998.

*Primary Examiner*—Hosain T. Alam
*Assistant Examiner*—Ella Colbert
*Attorney, Agent, or Firm*—Ipsolon LLP

[57] ABSTRACT

A hierarchical graphical listing or chart rendered on a display includes multiple nodes that are at different hierarchical levels and may include connecting branches that represent hierarchical links. Each of nodes is active and has an action associated with it so that the action is integrated into the information in the listing. In addition, the hierarchical graphical listings allow simple retrieval of information from a database record having plural fields. In one implementation, multiple successive hierarchical graphical listings are rendered. A user selects from each listing a node that corresponds to information of interest, as well as a field in a database record. The user selections of nodes from successive hierarchical graphical listings are tracked, and a database query is formed from the sequence of selections.

16 Claims, 16 Drawing Sheets

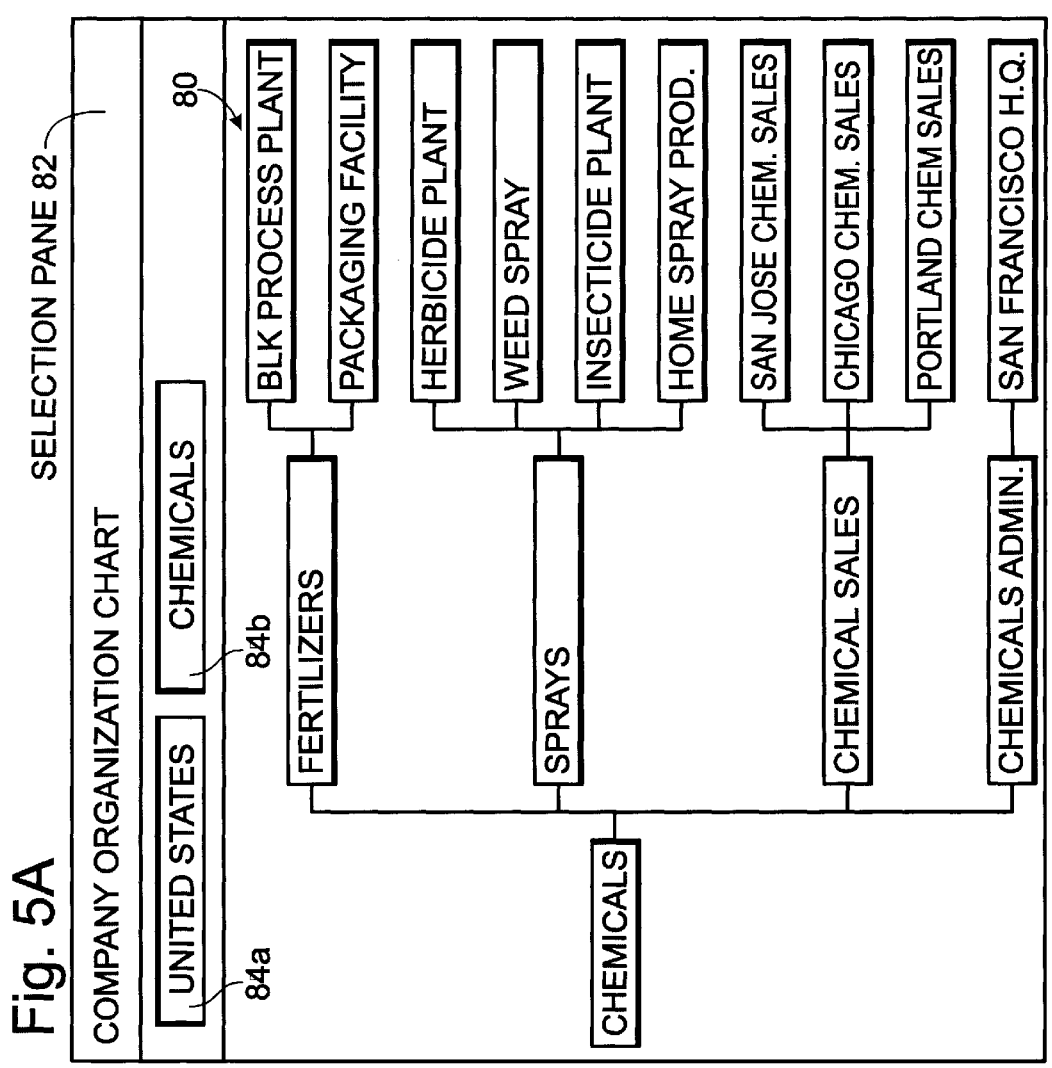

| | SELECTION KEY | | |
|---|---|---|---|
| | SELECTION FIELDS | SEPARATOR | USE NAME LIST |
| 1. | TYPE | - | |
| 2. | VARIETY NAME | | |
| 3. | | | |
| 4. | | | |
| 5. | | | |

OK  UPDATE

Fig. 7B

| ORCHARD PRODUCTION ANALYSIS | | | | | | | |
|---|---|---|---|---|---|---|---|
| ORCHARD | VARIETY | OWNERSHIP | ACRES | TONSXXX | TONS | TONS/ACRE | TREES |
| ANDERSON CREEK | *** | OWNED | 25 | 147 | | 6 | 6,596 |
| BARNES | *** | LEASED | 18 | 113 | | 6 | 728 |
| BEASON | RED ANGELOS | LEASED | 20 | 9 | | 0 | 7,200 |
| BOUME | *** | OWNED | 15 | 129 | | 9 | 1,899 |
| BUCKEYE | *** | OWNED | 30 | 129 | | 4 | 6,857 |
| CAROLINA WEST | *** | LEASED | 41 | 371 | | 9 | 10,964 |
| CEDARS | *** | OWNED | 51 | 703 | | 14 | 10,028 |
| DARK HALLOW | *** | LEASED | 24 | 174 | | 7 | 2,278 |
| DEVANEY | *** | OWNED | 21 | 188 | | 9 | 7,875 |
| EDGEVALS | *** | OWNED | 40 | 235 | | 6 | 11,593 |
| EL ROBLE | *** | OWNED | 106 | 562 | | 5 | 34,625 |
| FARM VALLEY | *** | OWNED | 12 | 198 | | 16 | 930 |
| FLETCHER | *** | LEASED | 20 | 234 | | 12 | 2,361 |
| GARRETT-CHILSON | *** | LEASED | 37 | 698 | | 19 | 3,494 |
| HIGHCROFT | *** | OWNED | 54 | 625 | | 12 | 10,763 |
| HILLDALE | *** | OWNED | 36 | 432 | | 12 | 4,042 |
| JAMES | *** | OWNED | 16 | 184 | | 11 | 3,101 |

| DATE | DAY | PLAN | REAL | DIFF. | % |
|---|---|---|---|---|---|
| 3-MAR | MON | 250 | 326 | 76 | 30 |
| 4-MAR | TUE | 250 | 389 | 139 | 56 |
| 5-MAR | WED | 250 | 375 | 125 | 50 |
| 6-MAR | THU | 250 | 324 | 74 | 30 |
| 7-MAR | FRI | 250 | 295 | 45 | 18 |
| 10-MAR | MON | 265 | 213 | -52 | -20 |
| 11-MAR | TUE | 265 | 349 | 84 | 32 |
| 12-MAR | WED | 265 | 289 | 24 | 9 |
| 13-MAR | THU | 265 | 471 | 206 | 78 |
| 14-MAR | FRI | 265 | 578 | 313 | 118 |
| 17-MAR | MON | 300 | 287 | -13 | -4 |
| 18-MAR | TUE | 300 | 497 | 197 | 66 |
| 19-MAR | WED | 300 | 512 | 212 | 71 |
| 20-MAR | THU | 300 | 321 | 21 | 7 |
| 21-MAR | FRI | 300 | 269 | -31 | -10 |
| 24-MAR | MON | 300 | 345 | 45 | 15 |
| 25-MAR | TUE | 285 | 318 | 33 | 12 |
| 26-MAR | WED | 285 | 297 | 12 | 4 |
| 27-MAR | THU | 285 | 346 | 61 | 21 |
| 28-MAR | FRI | 285 | 359 | 74 | 26 |
| 31-MAR | MON | 285 | 340 | 55 | 19 |
| TOTAL | | 5800 | 7500 | 1700 | 29.3 |

DATA DISPLAY SOFTWARE WITH ACTIONS AND LINKS INTEGRATED WITH INFORMATION

FIELD OF THE INVENTION

The present invention relates to presenting information to computer users and, in particular, to integrating actions in and links between information to provide improved access to the information.

BACKGROUND AND SUMMARY OF THE INVENTION

Computer users today are inundated with information, information sources, programs and ways of communicating. Users find it increasingly difficult to find the information they desire as increasing amounts of information become available. The proliferation of software applications and their features only exacerbates these difficulties. Typically, information, such as that provided by spreadsheet, database, or word processing programs, is distinguished and separated from the active program elements or graphical controls for controlling the program. This separation merely adds to the clutter of information and software devices available to users.

In text-based computer systems, the text commands or keystrokes for controlling the system must be known to and entered by a user. In a windowed computer environment, graphical control elements such as buttons, icons, and menus are provided to spare a user from using the text commands or keystrokes required in text-based systems. A common aspect of both types of computer system is that the control elements, whether text, keystrokes, or graphical elements, are all segregated from any underlying information provided by a program.

This distinction reflects a common software characteristic in which a computer program is held to be distinct from information (e.g., a document created in or viewed from the program). With the increasing complexity of computer systems and information provided by such systems, users often find it difficult to obtain either the desired information or the desired computer control elements.

One exception to such common distinctions between computer system control elements and information is the use of hyperlinks in some computer languages such as hypertext markup language (HTML). HTML allows links to different documents to be integrated into the information included in an HTML document. As a result, HTML allows information in a document to be linked to other relevant information without requiring separate text or graphical control elements. It is the power of such linkages that has contributed to the popularity of information sources such as the Internet and intranets.

While providing an improvement over the way in which conventional document files are related to each other, HTML remains limited to linking separate documents or files. Such linkages merely provide convenient access to fixed files of a common format or protocol and typically would not provide access to a wide range of file formats or information sources. The limitations of HTML are particularly acute with regard to obtaining information from a database data source.

In one implementation of the present invention, therefore, hierarchical graphical listing computer software resides in a computer readable medium and obtains data for and renders hierarchical graphical listings or charts. A hierarchical graphical listing or chart rendered on a display according to this invention includes multiple nodes that are at different hierarchical levels and may include connecting branches that represent hierarchical links.

Each of the nodes is active and has an action associated with it so that the action is integrated into the information in the listing. For reference purposes, the actions may be grouped as Display Actions, View/Play Actions, Editing Actions, and Other Actions. Display actions cause menus, charts, forms, and or network pages to be displayed and made available to a user. View/play actions cause a file of a selected file format to be opened, played, viewed, or run. Similarly, Editing actions allow such files to be edited. Other actions may include running a program, activating a telephone call, sending e-mail, or displaying a particular file type and are analogous to view/play actions.

The hierarchical graphical listing computer software of this invention allows information to be presented to users in a format that improves understanding of the relationships between the information. Examples of the types of information that can be provided include: the hierarchical levels of an organization such as a corporation, government, etc., relationships between the locations (e.g., nations, states, counties, cities, etc.) of people or entities, relationships between components within an article, machine, or software program, relationships between information sources such as computer files, sites on local or global computer networks, printed materials, etc., as well as virtually any other types of information having hierarchical relationships. Associating various possible actions with the nodes in such hierarchical graphical listings provides a powerful tool for conveying complex information.

In addition, such hierarchical graphical listings allow simple retrieval of information from a complex database record having plural fields. In one implementation, multiple successive hierarchical graphical listings are rendered. A user selects from each listing a node that corresponds to information of interest, as well as a field in a database record. The user selections of nodes from successive hierarchical graphical listings is tracked, and a database query is formed from the sequence of selections. In another implementation, the information in subsequent ones of the successive hierarchical graphical listings may also be modified according to the sequence of selections.

In yet another implementation, the information and active control elements are integrated with an information table or spreadsheet. Regions (e.g., rows) in the table or spreadsheet may function in the same way as the nodes of a hierarchical graphical listing. Integrating actions with information in a hierarchical graphical listing, table or spreadsheet provides a wide variety of formats for presenting and accessing information.

Additional objects and advantages of the present invention will be apparent from the detailed description of the preferred embodiment thereof, which proceeds with reference to the accompanying drawings.

BRIEF DESCRIPTION OF THE DRAWINGS

FIGS. 5A and 5B are illustrations of a graphical user interface for changing a previously selected node.

FIG. 7B is a diagram illustrating an exemplary integrated active information document as an integrated action/information spreadsheet.

FIGS. 8A and 8B are an illustration of a graphical user interface for a data selection panel and an associated target form, respectively.

DETAILED DESCRIPTION OF PREFERRED EMBODIMENTS

Figure 1:
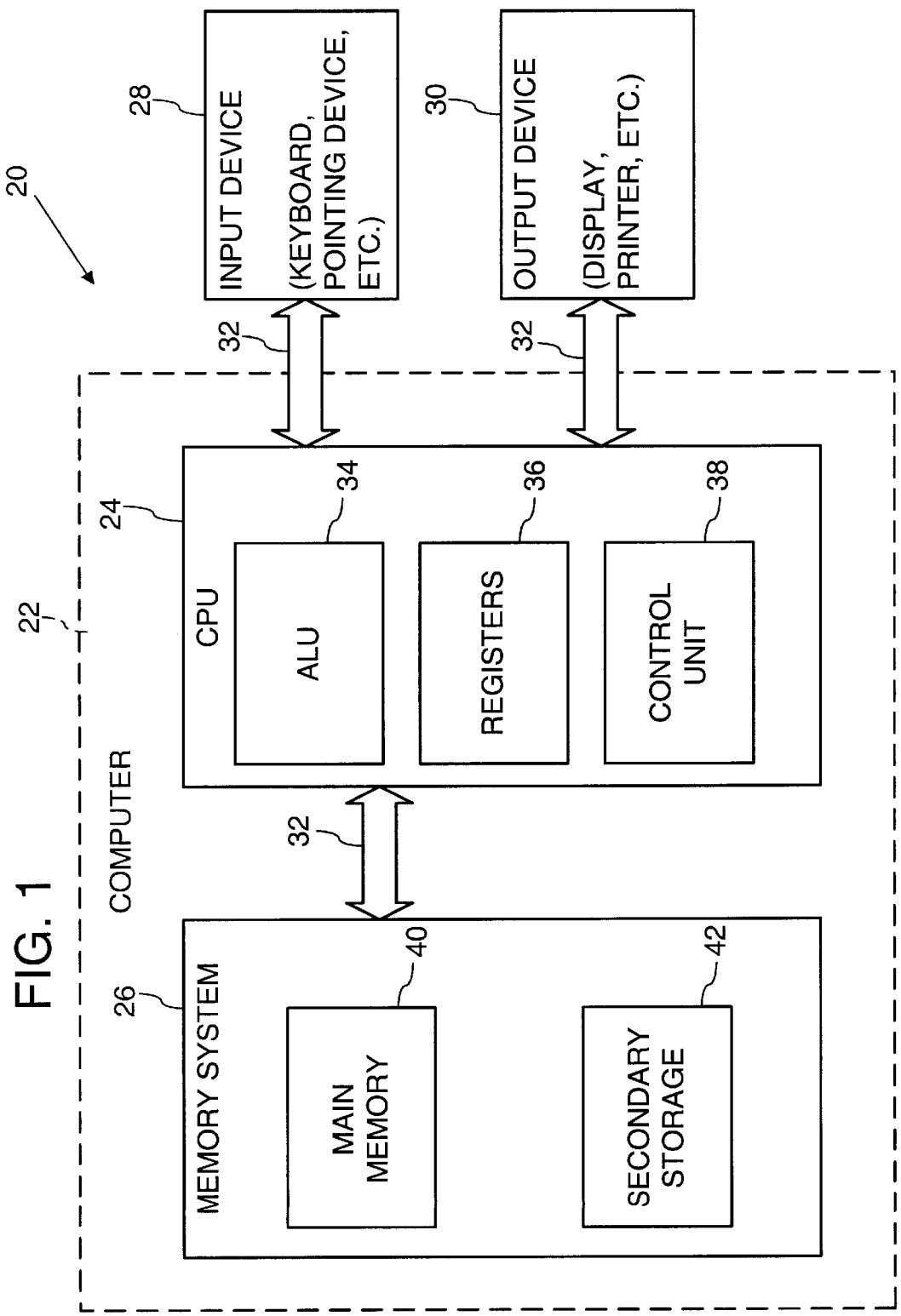
FIG. 1 is a block diagram of a computer system that may be used to implement the present invention.

FIG. 1 illustrates an operating environment for an embodiment of the present invention as a computer system 20 with a computer 22 that comprises at least one high speed processing unit (CPU) 24 in conjunction with a memory system 26, an input device 28, and an output device 30. These elements are interconnected by at least one bus structure 32.

The illustrated CPU 24 is of familiar design and includes an ALU 34 for performing computations, a collection of registers 36 for temporary storage of data and instructions, and a control unit 38 for controlling operation of the system 20.The CPU 24 may be a processor having any of a variety of architectures including Alpha from Digital, MIPS from MIPS Technology, NEC, IDT, Siemens, and others, x86 from Intel and others, including Cyrix, AMD, and Nexgen, and the PowerPC from IBM and Motorola.

The memory system 26 generally includes high-speed main memory 40 in the form of a medium such as random access memory (RAM) and read only memory (ROM) semiconductor devices, and secondary storage 42 in the form of long term storage mediums such as floppy disks, hard disks, tape, CD-ROM, flash memory, etc. and other devices that store data using electrical, magnetic, optical or other recording media. The main memory 40 also can include video display memory for displaying images through a display device. Those skilled in the art will recognize that the memory 26 can comprise a variety of alternative components having a variety of storage capacities.

The input and output devices 28 and 30 also are familiar. The input device 28 can comprise a keyboard, a mouse, a physical transducer (e.g., a touchscreen or microphone), etc. The output device 30 can comprise a display, a printer, a transducer (e.g., a speaker), etc. Some devices, such as a network interface or a modem, can be used as input and/or output devices.

As is familiar to those skilled in the art, the computer system 20 further includes an operating system and at least one application program. The operating system is the set of software which controls the computer system's operation and the allocation of resources. The application program is the set of software that performs a task desired by the user, using computer resources made available through the operating system. Both are resident in the illustrated memory system 26.

In accordance with the practices of persons skilled in the art of computer programming, the present invention is described below with reference to acts and symbolic representations of operations that are performed by computer system 20, unless indicated otherwise. Such acts and operations are sometimes referred to as being computer-executed and may be associated with the operating system or the application program as appropriate. It will be appreciated that the acts and symbolically represented operations include the manipulation by the CPU 24 of electrical signals representing data bits which causes a resulting transformation or reduction of the electrical signal representation, and the maintenance of data bits at memory locations in memory system 26 to thereby reconfigure or otherwise alter the computer system's operation, as well as other processing of signals. The memory locations where data bits are maintained are physical locations that have particular electrical, magnetic, or optical properties corresponding to the data bits.

Figure 2:
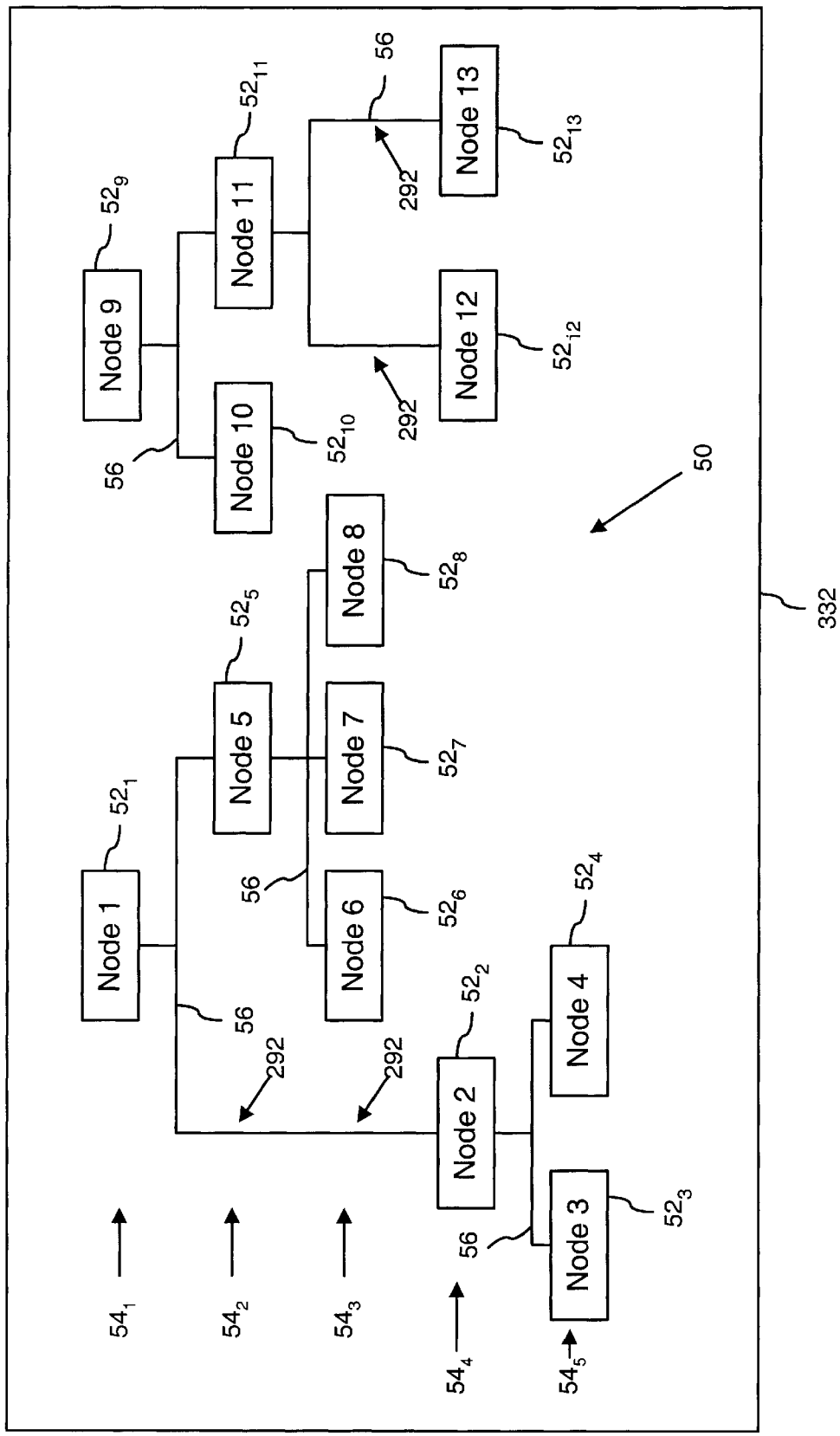
FIG. 2 is a diagram illustrating an exemplary vertical format chart rendered on a display to represent a hierarchical graphical listing of related information.

FIG. 2 is a diagram illustrating an exemplary integrated active information document in the form of a vertical format chart 50 in which active control elements (e.g., nodes 52) are integrated into information provided in the document. Vertical format chart 50 is rendered on a display (e.g., output device 30) for a computer user to represent a hierarchical graphical listing of related information. Chart 50 includes multiple nodes 52 that are at different hierarchical levels 54 and include connecting branches 56 that represent hierarchical links. It will be appreciated that the particular hierarchical relationships depicted in FIG. 2 are illustrative and that chart 50 could include virtually any relationships between nodes 52, levels 54, and branches 56 according to the invention described herein. Nodes 52 that are at different hierarchical levels 54 and are linked by branches 56 are sometimes referred to as having parent/child relationships. A parent node (e.g., $52_2$) is at a hierarchically higher level (e.g., $54_4$) than the level (e.g., $54_5$) a child node (e.g., $52_3$).

Nodes 52 are labeled with a generic numeric nomenclature, but as applied to represent actual information nodes 52 would bear names corresponding to particular groups of types of information. Examples of the types of information that nodes 52 could represent include: the hierarchical levels of an organization such as a corporation, government, etc., relationships between the locations (e.g., nations, states, counties, cities, etc.) of people or entities, relationships between components within an article, machine, or software program, relationships between information sources such as computer files, sites on local or global computer networks, printed materials, etc., as well as virtually any other types of information having hierarchical relationships.

Each of nodes 52 is active and has associated with it an action, and Table 1 lists an exemplary set of actions available for implementation from a node 52. For reference purposes, the actions are grouped as Display Actions, View/Play Actions, Editing Actions, and Other Actions. Display actions cause menus, charts, forms, and or network pages to be displayed and made available to a user. Menus are provided upon start-up of the computer software utilizing the present invention. A menu may be public and available to all users in a group or network, or may be private and available only to one or more selected users. A menu may include multiple active nodes that might or might not have any hierarchical relationship between them. Each node on a menu may have associated with it one of the actions in Table 1. Moreover, both public and private menus may include multiple hierarchical levels.

A chart is a hierarchical graphical listing of related information, such as exemplary chart 50 of FIG. 2. A chart may be public and available to all users in a group or network, or may be private and available only to one or more selected users, or may be a series of charts linked together. A form displays information in formats other than as hierarchical graphical listings and may include active features, such as those listed in Table 1, or may allow a user to add or update information. Display of a network page may be used by a user to view an HTML file available on the Internet or an intranet, for example.

TABLE 1

| Action Class | Action Type | Action Function |
|---|---|---|
| Display Actions | Public menu | Display a public menu |
| | Private menu | Display a private menu |
| | Public chart | Display a public chart |
| | Private chart | Display a private chart |
| | Active form | Display an active form |
| | Information form | Display an information form |
| | Update form | Display a file update form |
| | Net page | Show an HTML page which is local or on the Internet |
| View/Play Actions | Play audio | Play an audio file |
| | View document | Display a document |
| | View picture | Display a picture |
| | View report | Display or print a report |
| | View video | Show a video |
| Editing Actions | Edit audio | Edit an audio file |
| | Edit document | Edit a document such as a spreadsheet or word processor file |
| | Edit picture | Edit a picture |
| | Edit report | Edit a report |
| | Edit video | Edit a video |
| Other Actions | Program | Run a program |
| | Contact | Place a call or send e-mail |
| | Document | Display a file based on its file suffix |

View/play actions cause a file of a selected file format to be opened, played, viewed, or run. Similarly, Editing actions cause such files to be edited. Other actions include running a program, activating a telephone call, sending e-mail, or displaying a particular file type and are analogous to view/play actions. However, the other actions relate to features that are conceptually different from simply viewing a file and are grouped separately for user convenience.

The hierarchical graphical listing provided by chart 50 is provided to or rendered for a user who navigates to the chart from an active node in a menu, another chart, or a form. The node would have associated with it either of the public chart or private chart actions in Table 1. The rendering of chart 50, including the hierarchical relationships between nodes 52 and the actions associated with them, is based upon a chart definition that is established according to this invention.

In one implementation, the information within chart 50 comes from a database data source or record having multiple fields (e.g., database table columns). Each field corresponds to a category of information in the database. The database includes multiple data records that each includes data in one or more of the fields. The database data source may be any of a variety of databases and database formats including Open Database Connectivity (ODBC) databases such as Access and SQL Server from Microsoft Corporation and Oracle from Oracle Corporation. For purposes of discussion and illustration, the following description makes reference to SQL server-based operations. It will be appreciated that these references are illustrative and do not limit the applicability of this invention to other databases or database formats.

Figure 3:
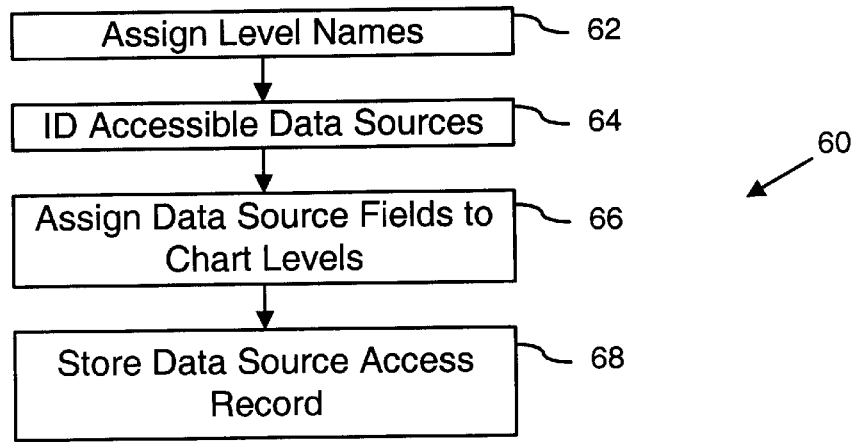
FIG. 3 is a flow diagram of a database association process for associating a chart with a database data source.

FIG. 3 is a flow diagram of a database association process 60 for associating a chart (e.g., chart 50) with a database data source. Association process 60 allows one or more charts to be used to access the data source as illustrated in FIG. 3.

process block 62 indicates that each level in the chart is assigned a Level Name, which is equivalent to assigning a field name to that level. For example, in a chart of geographical locations the levels might be named "Country," "State," and "City."

Process block 64 indicates that one or more database data sources are identified as being accessible from the chart.

Process block 66 indicates that a field from the data source or data sources is assigned to each of the chart levels to form field/chart level assignments. In one implementation, the data type of the field is recorded so subsequent SQL statements can be properly constructed. Another implementation provides that the field in the data source record is to be compared to node codes or to node names of one or more levels.

Process block 68 indicates that the Level Name, identifications of the accessible databases, and the field/chart level assignments are stored in a data source access record.

Chart 50 can be one of multiple related charts that can be rendered from the multiple records and fields within the database record or data source. In addition, chart 50, either alone or in combination with one or more other charts, can be used to identify a particular set of records for retrieval from the database. This use of charts to identify records for retrieval from the database is referred to as chart navigation.

Figure 4:
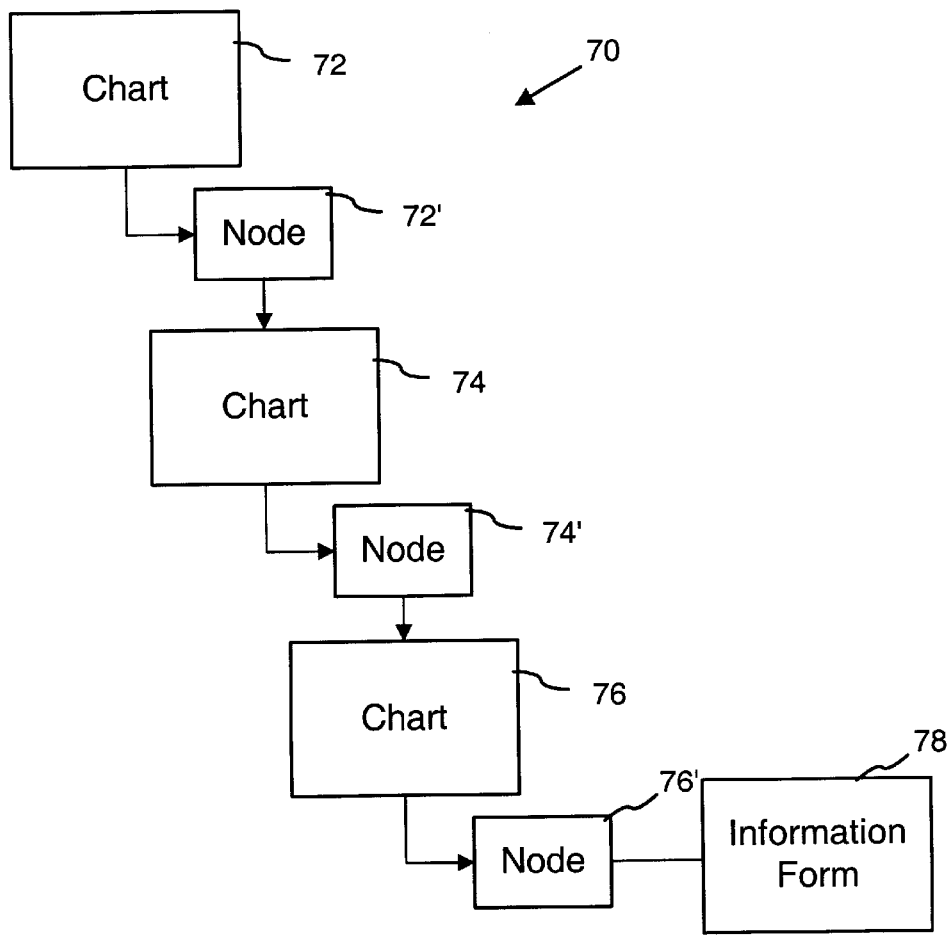
FIG. 4 is a block diagram illustrating a sequence of charts from which a user successively selects individual nodes.

FIG. 4 is a block diagram illustrating a sequence 70 of charts 72–76 from which a user successively selects individual nodes 72'–76'. Each of charts 72–76 is analogous to chart 50 in that it represents a hierarchical relationship between the multiple nodes within each chart (only selected nodes 72'–76' are shown). For example, each chart could correspond to information in a field or group of fields with the database data source. The result of the user selecting each of nodes 72' and 74' is that the Display Chart action (Table 1) is executed and respective charts 74 and 76 are rendered.

The result of the user selecting node 76' is that the Form action (Table 1) is executed and an information form 78 is rendered displaying information from the database data source according to the sequence of nodes 72'–76' selected by the user. For example, chart 72 could represent the divisions of a large company, chart 74 could represent the places (countries, states, cities) where the company has facilities, and chart 76 could represent the products or components made at each facility. Node selections 72'–76' would cause information form 78 to show the particular combination of division/place/product fields chosen by the user. Arbitrary numbers of charts could be linked in this manner. In addition, records may be identified for retrieval from the database without a complete sequence of node selections by use of a separate user "print" or "display" command (e.g., selecting a graphical control button).

In the chart navigation illustrated in FIG. 4 the user selects a node from a chart and identifying information about the node is recorded. This process can continue through as many charts as are available or until the user requests some display media. The sequence of node selections is then analyzed and used to construct a database query (e.g., an SQL statement) to access a set of records conforming to the accumulated selection criteria.

FIG. 5A is a diagram illustrating an exemplary horizontal format chart 80 as rendered on a display (e.g., output device 30) together with a selection panel 82 that indicates previously selected nodes 84a and 84b. A user can change previously selected node 84a by clicking on or otherwise selecting it in selection panel 82. In response to that selection, chart 86 (FIG. 5B) to which previously selected node 84a belongs is displayed in an outline form, and the user can select a new node from chart 86. Selection panel 82 and chart 86 allow the user to change node selections without reverse-navigating back to where the change is to be made.

Figure 6A:
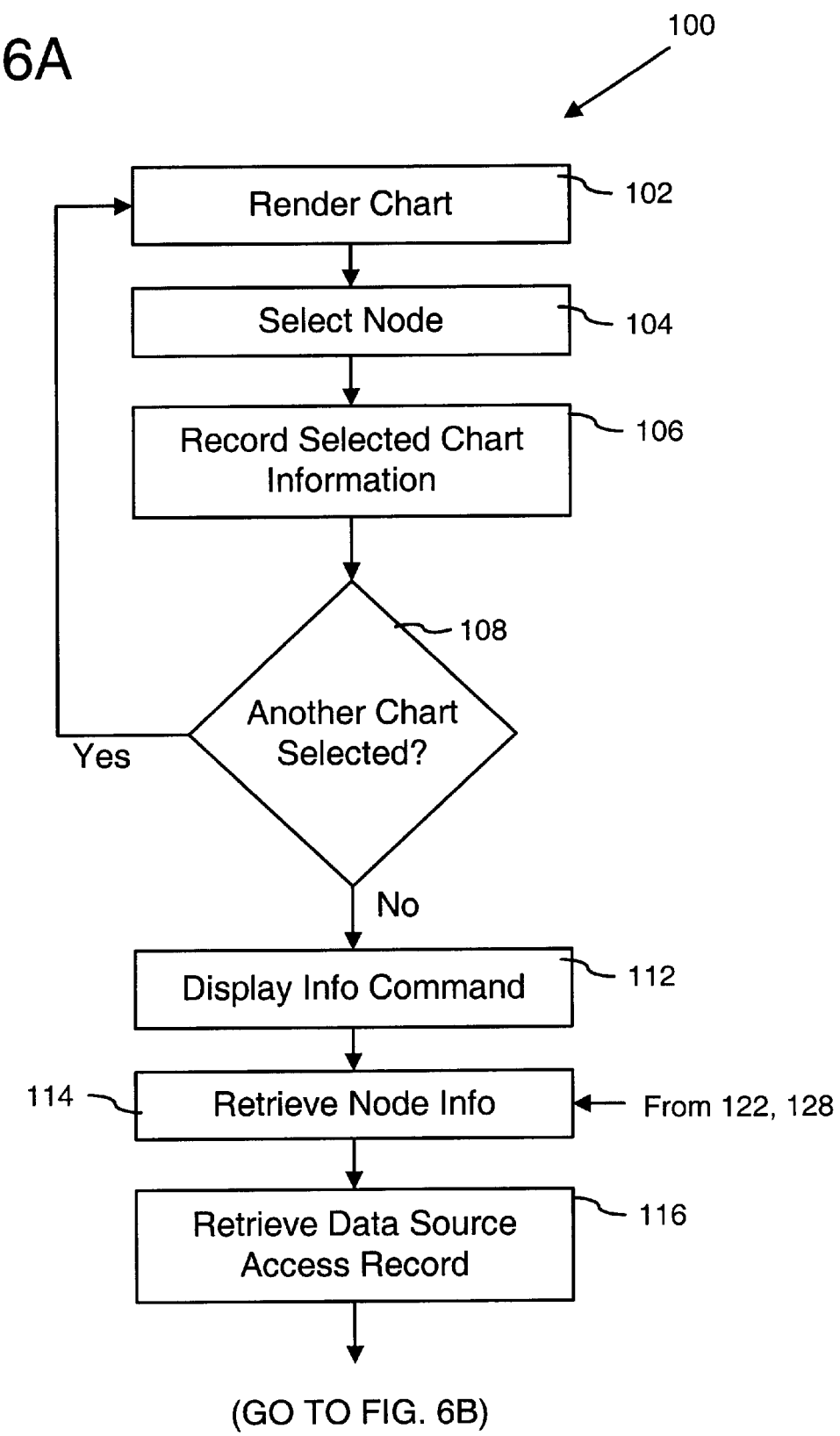
FIGS. 6A and 6B are a flow diagram of database query construction process by which a database query is constructed from a user's chart navigation sequence.
Figure 6B:
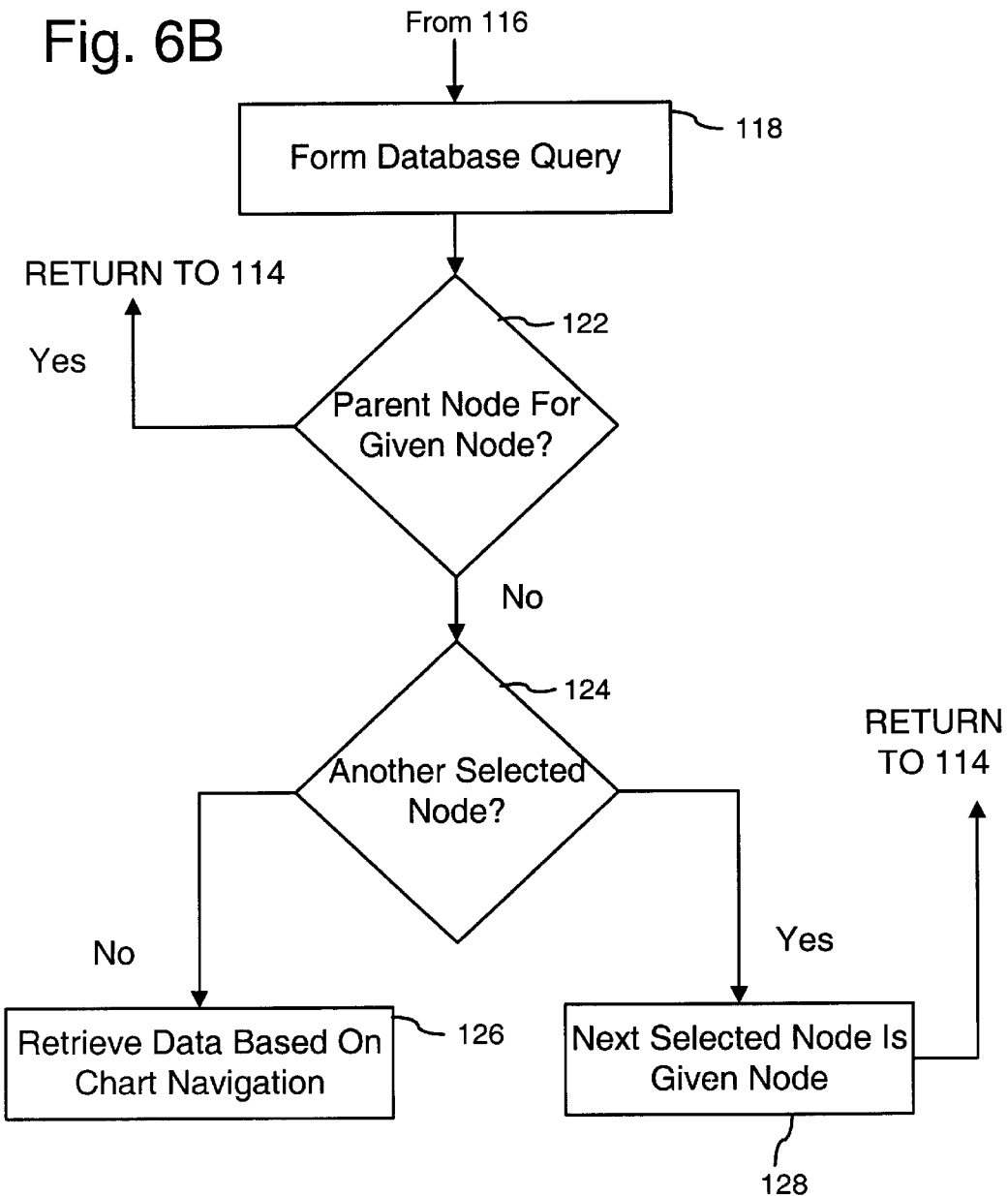

FIGS. 6A and 6B are a flow diagram of database query construction process 100 by which a database query (e.g., an SQL statement) is constructed or formed from a user's chart navigation sequence (shown within process 100). As indicated above, particular reference to SQL terminology is for purposes of illustration and not a limit on the applicability of this method.

Process block 102 indicates that a chart is rendered or drawn on a computer display screen. The chart includes a hierarchical arrangement of multiple nodes (e.g., as in chart 50), and is associated with a data source such as a database according to a data source access record, which is described with reference database association process 60 of FIG. 3.

Process block 104 indicates that a user selects a node on the chart. The selection may be made by any computer input means such as by "clicking" the node with an input device like a mouse or by touching the node on a touch sensitive computer display screen.

Process block 106 indicates that information about the selected node is recorded. The information may include the name of the chart, the identifying code for the node, and a record number that points to a record that contains additional information about the node, as described below in greater detail.

Query block 108 represents an inquiry as to whether another related chart is selected by the user. If another related chart is selected, query block 108 returns to process block 102 for rendering of the selected chart. If another related chart is not selected, query block 108 proceeds to process block 112. Related charts are associated with the same data source.

Process block 112 indicates that the user selects a command or graphical control to display information according to the nodes selected during the chart navigation sequence. To obtain the information for display, an SQL statement is constructed according to the following steps.

Process block 114 indicates that the node information recorded at process block 106 is retrieved for a given node. In an initial pass through this step, the given node is the node that was selected from the first chart in the chart navigation sequence.

Process block 116 indicates that the data source access record is retrieved for the chart of the given node.

Process block 118 indicates a database query is formed. In one implementation, an SQL statement of the following form is built with respect to the given node from the node name or node code (described below) and the data source field name for the chart level:

WHERE<data source field name>=<the node's code>.

Query block 122 represents an inquiry as to whether the given node has a parent node. If the given node has a parent node, query block 122 returns to process block 114 and the parent node is designated the given node. In the implementation referred to in process block 118, the SQL statement for each successive parent node is concatenated to the preceding statement, except that "WHERE" is not repeated and "AND" connectors are placed between each segment. If the given node does not have a parent node, query block 122 proceeds to query block 124.

Query block 124 represents an inquiry as to whether another node was selected in the chart navigation sequence. If no other node was selected, query block 124 proceeds to process block 126. If another node was selected, query block 124 proceeds to process block 128.

Process block 128 indicates that the node selected from the next chart in the chart navigation sequence is designated the given node. Process block 128 returns to process block 114.

Process block 126 indicates that information according to the nodes selected during the chart navigation sequence is retrieved for display according to the query formed by process steps 114–128. In the illustrated implementation, the SQL statement constructed incrementally according to selected nodes and their parent nodes is used to access the data source to retrieve the desired set of records.

Figures 7A, 9B:
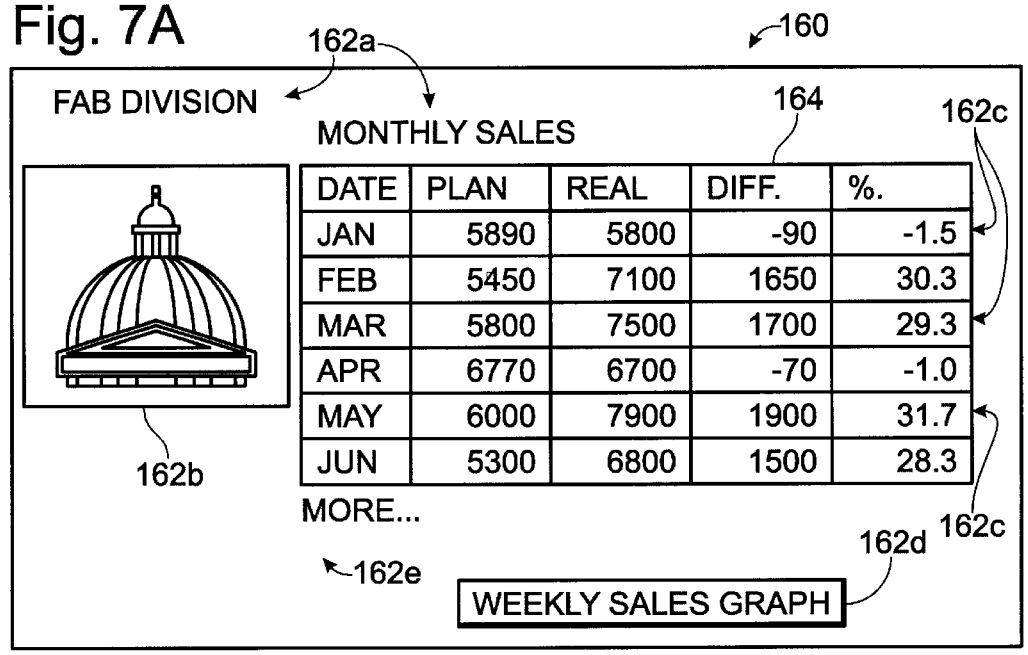
FIG. 7A is a diagram illustrating an exemplary integrated active information document as an integrated action/information form.
FIG. 9B is an illustration of a graphical user interface for a selection key by which the user can control the fields used for a page selection list.

FIG. 7A is a diagram illustrating another exemplary integrated active information document as an integrated action/information form 160 in which active control elements 162a–162e are integrated into information provided in the document. Integrated action/information form 160 is rendered on a display (e.g., output device 30) for a computer user to represent a hierarchical graphical listing of related information. Control elements 162 are more particularly designated a heading 162a, a graphical image 162b, lines 162c within a dynamic information table 164, a user control button 162d, and a hot spot 162e.

It will be appreciated that the combination of control elements 162 in form 160 is illustrative and that form 160 could include virtually any combination, including all or fewer than all elements 162, multiple ones of any or all components 162, or any arrangement of those elements. Similarly, form 160 is depicted with exemplary information to better illustrate the functions and uses of the control elements 162, but the exemplary information in no way limits the applicability of the elements to other types of information. Each of control elements 162 may be active and has associated with it an action such as one of the actions in the exemplary set of actions listed in Table 1.

Heading 162a is a title for form 160 or a component of form 160 such as table 164 or graphical image 162b. Graphical image 162b typically would relate to the subject matter form 160 to provide graphical context to the other information in the form and may be of high, photographic quality or resolution or of lower quality or resolution. Control button 162d may provide a familiar graphical control device by which a user can select an action, and hot spot 162e can operate in an analogous manner without including the appearance of control button 162d. Hot spot 162e may be used where a button might have a cluttered appearance.

Table 164 is an array or grid of information with lines 162c of information aligned into columns. Each column includes a name, title, or heading that indicates what information is in the column. Each of lines 162c in information table 164 represents an associated set of information. In the exemplary information of FIG. 7A, the third line 162c indicates planned and actual sales information for the month of March, as well as the arithmetic and percentage differences. The associated set of information in each line 162c may correspond therefore to a separate active control element having a particular associated action, such as any of the actions in Table 1. For example, selection of a line 162c can access the underlying data record from which the line is formed.

FIG. 7B is a diagram illustrating yet another exemplary integrated active information document as an integrated action/information spreadsheet 170 in which active control elements 172 are integrated into information provided in the document. Control elements 172 are more particularly designated the lines 172 within spreadsheet 170. Spreadsheet 170 may be considered a special case of form 160 in which spreadsheet 170 is its own complete form. Spreadsheet 170 is distinct from table 164 in that the former is not rendered with other control elements and may include embedded formulas and functions of a standard spreadsheet application such as Excel from Microsoft Corporation. Spreadsheet 170 and table 164 are similar in that the former may implement and be populated by actions the same as the latter.

Chart 50, form 160, and spreadsheet 170 are examples of integrated active information documents. A user can initiate actions from within these documents by "clicking upon", or in some other way selecting, any of a variety of control elements. When an action is initiated by a user selecting a control element, the chart 50, form 160, or spreadsheet 170 from which an action is initiated is designated an Action Source. Table 2 summarizes the exemplary control elements and associated Action Sources.

TABLE 2

| Control Element | Action Source |
| --- | --- |
| Chart node | Chart to which the node belongs |
| Button | Form on which the button resides |
| Picture | Form on which the picture resides |
| Heading | Form on which the heading resides |
| Hot spot | Form on which the "hot spot" resides |
| Table line (tables reside on forms) | Table containing the line |
| Spreadsheet line | Spreadsheet |

More specifically, an action is initiated with an action command, which includes an action type and an action target together in a command line. Table 1 exemplary action types, which are the particular actions to be performed such as run a program, display an information form, go to a chart, or play an audio file. An action target is the specific program to be run, form to be displayed, etc. As a result, the action type and action target of an action command could be, respectively, Play audio and C:\audio files\presidents_speech.wav. The action string can have additional arguments attached to further control the action target.

Once it is selected or initiated, the action command is parsed and the different action types are processed by corresponding system resources. If an action requires formation of a database query (e.g., an SQL statement), the query is also formed. Different exemplary actions are handled as set forth in Table 3.

TABLE 3

| Action Type | Action Target | Action Processing |
| --- | --- | --- |
| Info form | User defined information form | 1. Clone an information form<br>2. Format the information form<br>3. Create database query<br>4. Put data in the information form |
| Update form | User defined update form | 1. Clone an update form<br>2. Format the update form<br>3. Create database query<br>4. Put data in the update form |
| Spreadsheet | User defined spreadsheet | 1. Clone a spreadsheet<br>2. Format the spreadsheet<br>3. Create database query<br>4. Put data in the spreadsheet |
| Basic form | Predefined form | 1. Display the form |
| Report | Report definition file | 1. Create database query<br>2. Run the report for the selected data |
| Play audio | Audio file | Use an OLE control to play the audio |
| Play video | Video file | Use an OLE control to show the video |
| Other media | Media file | Run media based on its file type |
| Chart | User defined chart | 1. Clone the basic chart form<br>2. Draw the chart |
| Menu | User defined menu | 1. Clone the basic menu form<br>2. Draw the menu |
| Net site | Internet URL | Invoke a browser and go to the internet site |
| Program | Program file | Execute the program |
| Document | Document file | Display a document based on its file type |
| Contact | Contact file | Place a call or send e-mail |

An action can be initiated from an object, such as a chart, that will cause a target, such as an information form, to be displayed. The information form might contain a button which, when clicked, could invoke a second action that would display a spreadsheet. For purposes of the second action, the information form becomes the origin and the spreadsheet becomes the target. In this way, an action can lead to numerous other action choices and rich navigational scenarios can be built.

In an implementation described above, information within chart 50 is obtained from a database data source. Similarly, information in any of the components or control elements of a form 160, including a table 164, and spreadsheet 170 may be obtained from one or more database data sources. The different control elements may obtain information from the same or different database data sources.

Table 164 is particularly similar to chart 50 in the functional relation to a database. Like chart 50, table 164 can be one of multiple related tables that can be rendered from the multiple records and fields within the database data source. The records from the database that are used to populate lines in table 164 may be determined using an SQL statement, as described with reference to FIG. 6. In addition, table 164, either alone or in combination with one or more other tables, charts, or other control elements, can be used to identify a particular set of records for retrieval from the database. Information analogous to the data source access record (described with reference to FIG. 6) is associated with each line in table 164. As a result, table 164 and other tables can identify records for retrieval from the database in the same manner as the chart navigation described above.

Action sources, such as table 164 and forms 160, each have a data source assigned to them. Action targets, such as forms, tables, spreadsheets and reports also have their own data source. If the action associated with a line in table 164 calls for the display of data, such as a form, spreadsheet, or report, then the contents of the table can be used to select the data to be displayed. The desired set of records to be sent to the target (e.g., displayed) can be obtained by a database query (e.g., an SQL statement) formed from data from the specific table line selected (i.e., the origin's data source); fields from the data source assigned to the action target to be displayed (i.e., the target's data source); and user-specified data selection for the action sources and targets.

Figure 8A:
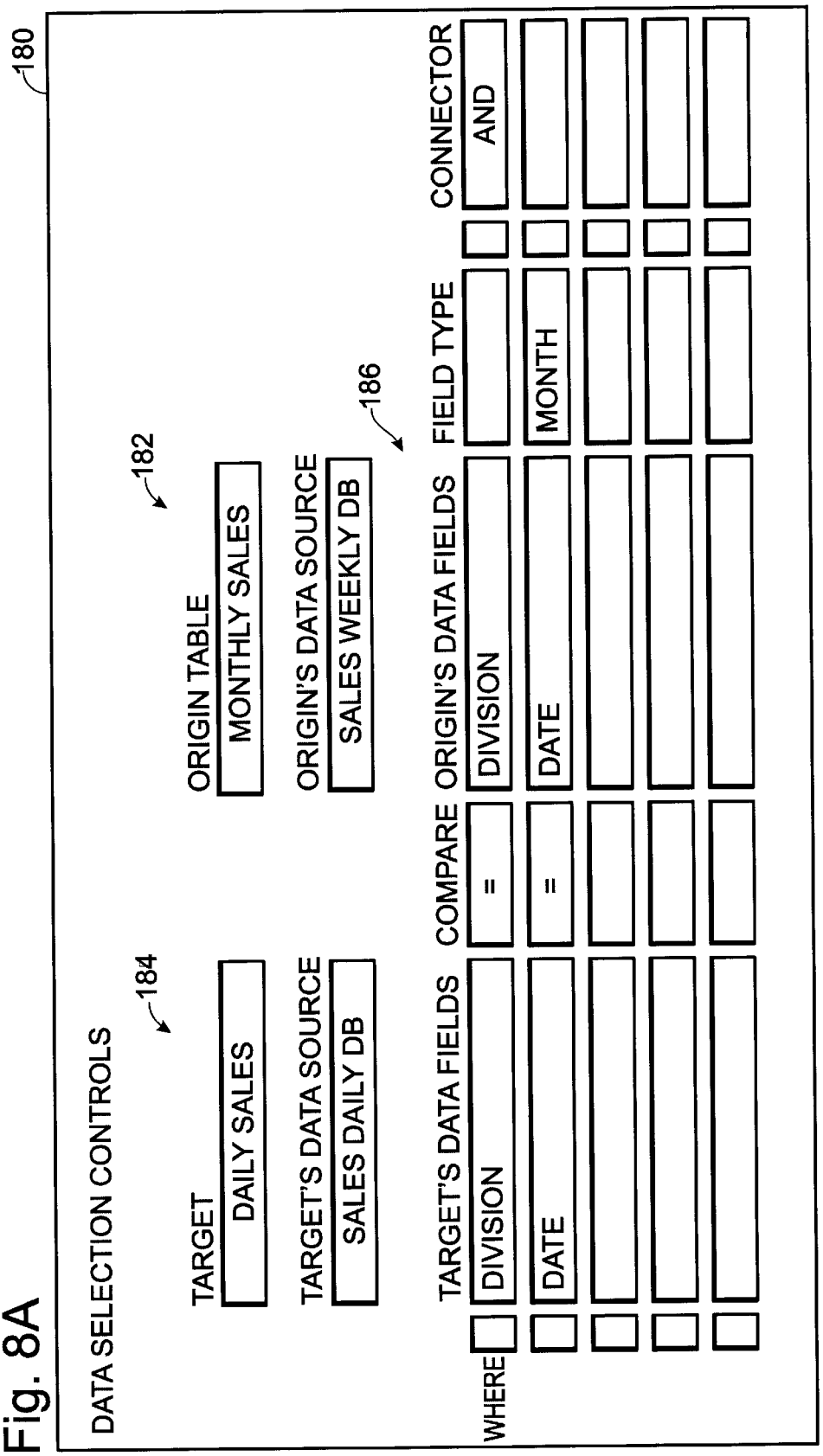

FIG. 8A is an illustration of a graphical user interface for a data selection panel 180, as it would be rendered on a computer display screen, for determining the user-specified data selection for the action sources and targets. Data selection panel 180 includes data selection controls 182 for specifying the origin table and the origin data source and data selection controls 184 for specifying the target form and the target data source. Panel 180 also includes categories 186 associating particular origin and target data fields.

Data selection panel 180 has exemplary information corresponding to the exemplary source or origin information in table 164 of form 160 in FIG. 7A and an exemplary target daily sales table 188 illustrated in FIG. 8B. Target table 188 would be included in a form and is for the month of March based on a user selection of the third line 162c from table 164. Data selection controls 182 show that origin table 164 is "monthly sales" and that table 164 is populated from an origin data source "sales weekly DB." Data selection controls 184 show that target table 188 is "daily sales" and is populated from a target data source "sales daily DB." Categories 186 show that the March time period and the corporate division (indicated as "Fab Division") in heading 162a of form 160) are carried from form 160.

Figure 9A:
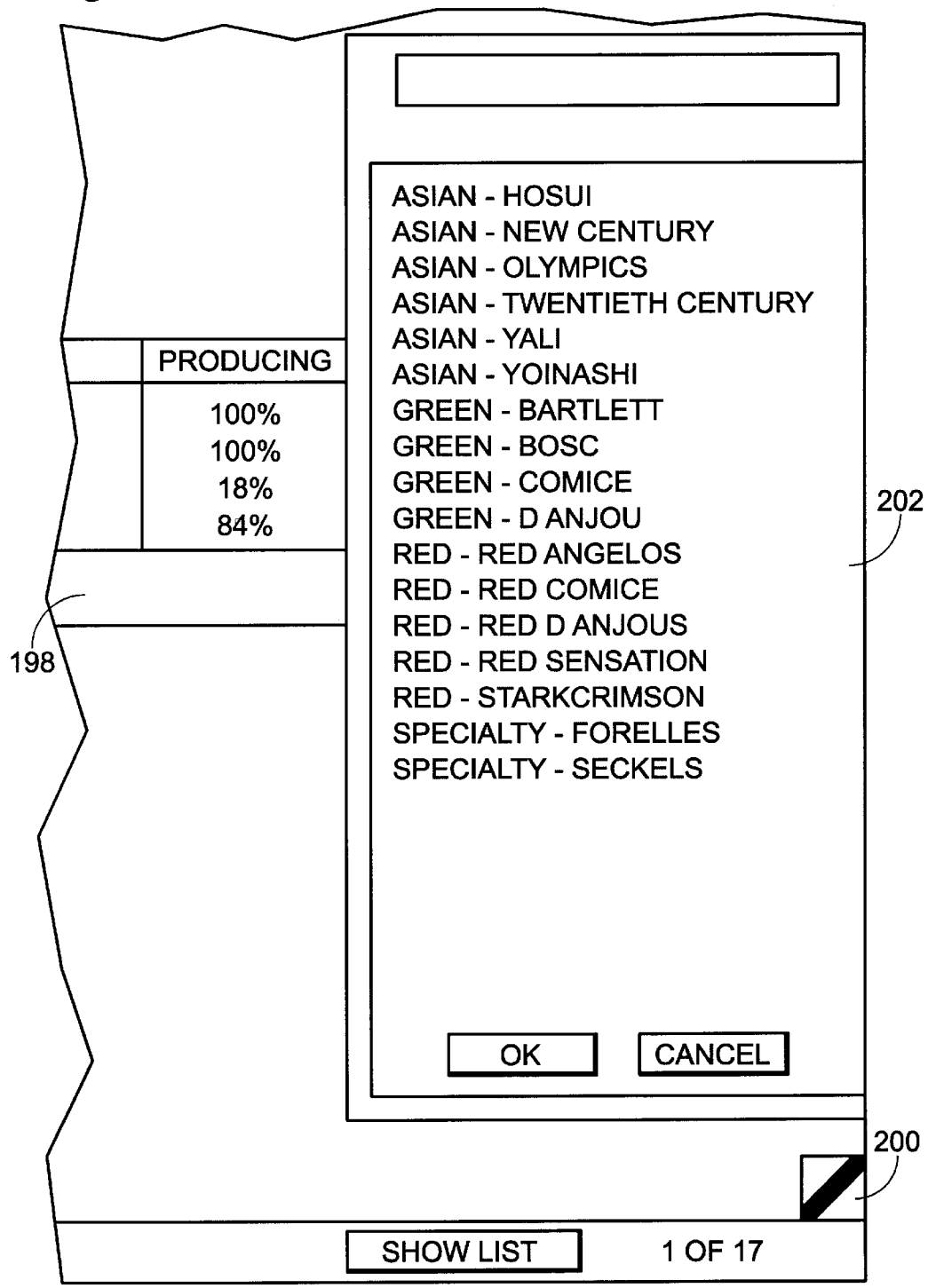
FIG. 9A is an illustration of a graphical user interface for paging among multiple forms.

With reference to FIG. 9A, a form 198 (e.g., analogous to form 160, partly shown in FIG. 9A) contains objects such as text fields, headings, pictures, etc. that show information from a record (a database table row). The set of records that are delivered to a form is dependent on a user's prior selection of nodes on charts and objects on other forms. A form will display the data, one record at a time, for a set of records that are delivered to it from a data selection process. If more than one record is obtained, the form acts like a book with each record being a separate page. The user can step from one record to another sequentially by "clicking on" or otherwise selecting a page turn element 200 rendered on the form (e.g., the lower right corner of form 198).

As an alternative, the user can use a "pop-up" selection list 202 to select a specific record. Each line in the selection list represents a record with identifying information (key fields). The list is in sequence by the contents of the fields that make up the key fields. The sequence of the list determines the record sequence for paging.

FIG. 9B is an illustration of a graphical user interface for a selection key 204 by which the user can control the fields used for the selection list, the sequence of items in the list, and the sequence of records when paging. The user may specify the names of the data source fields to be used as key fields and the key field separators such as a commas, dashes, or spaces, and the name of a translation list to be used in the event that a data source field contains codes that need to be changed into names to make the list more readable. In the examples of FIGS. 9A and 9B, the fields type and varietyname are specified.

Figure 10:
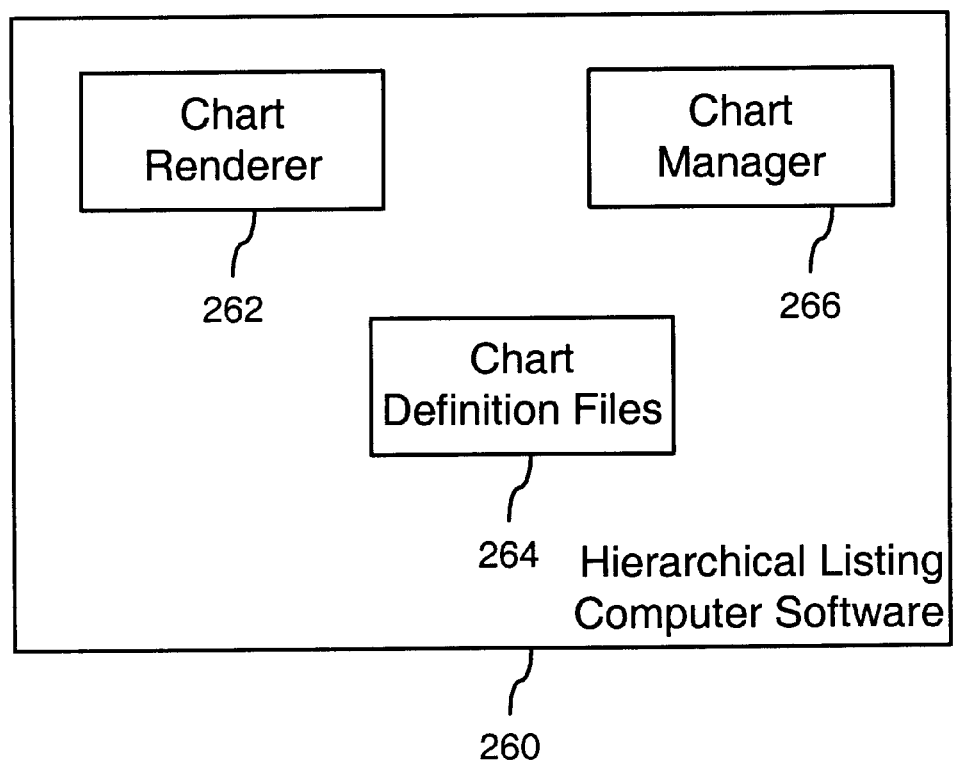
FIG. 10 is a block diagram of a hierarchical graphical listing computer software that obtains data for and renders hierarchical graphical listings or charts.

FIG. 10 is a block diagram of a hierarchical graphical listing computer software 260 that resides in a computer readable medium (e.g., memory system 26) and obtains data for and renders hierarchical graphical listings or charts such as chart 50. Hierarchical graphical listing software 260 includes a chart renderer 262 that renders charts (e.g., chart 50) according to information in the form of chart definition files 264 held in a computer readable medium (e.g., memory system 26). Chart definition files 264 may be generated by user in conjunction with a chart manager 266. Hierarchical graphical listing software 260, including chart renderer 262 and chart manager 266, may operate within a windowed user interface environment provided by an underlying operating system, for example.

Figure 11:
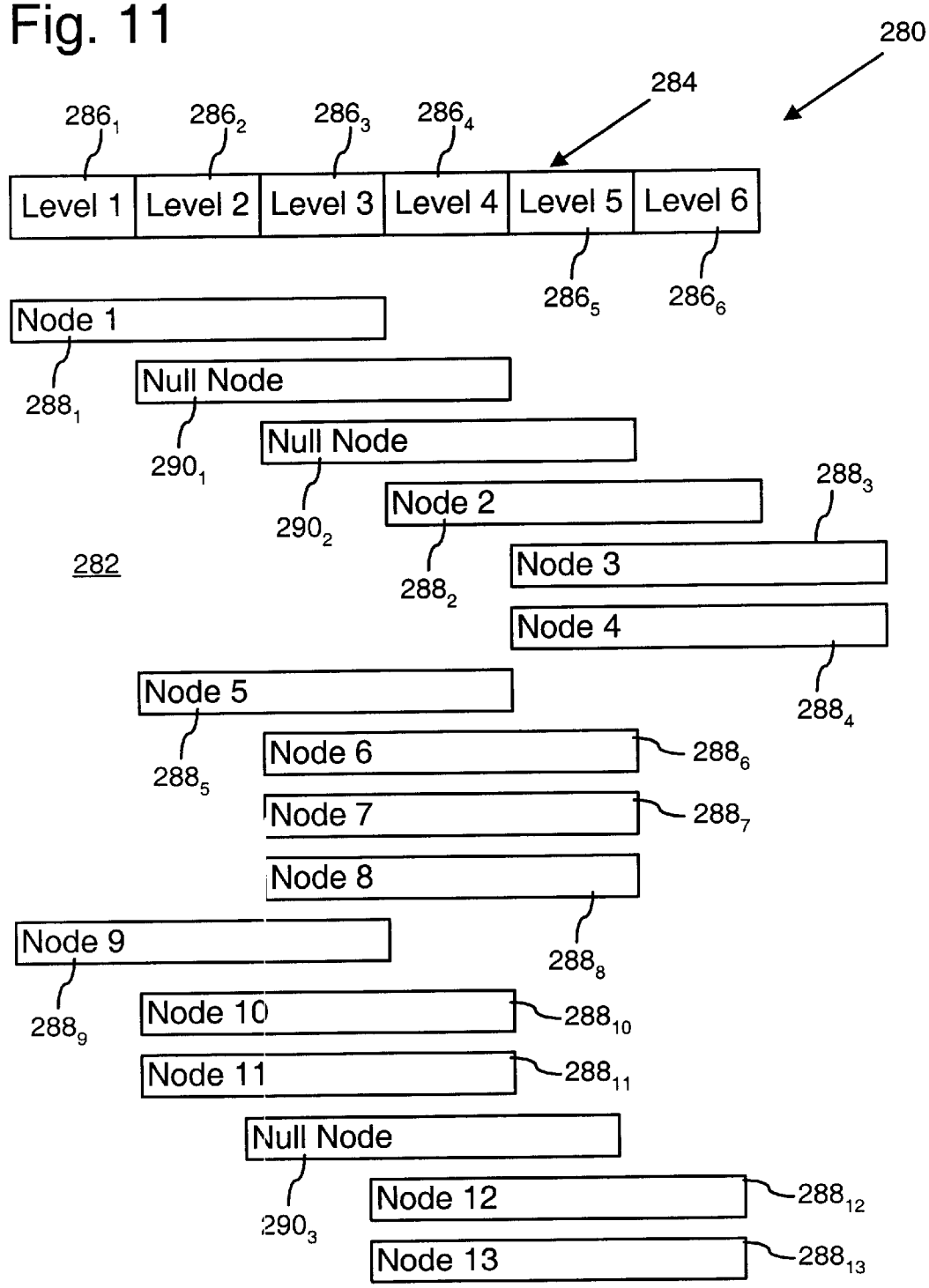
FIG. 11 is an illustration of a graphical user interface for a chart manager component of the hierarchical graphical listing computer software of FIG. 10.

FIG. 11 is an illustration of a graphical user interface 280 for chart manager 266 of hierarchical graphical listing computer software 260 for establishing an outline-based definition 282 of a chart such as chart 50. Chart manager user interface 280 would typically be rendered in a windowed computer environment, for example.

Chart manager user interface 280 includes a hierarchical level bar 284 that defines multiple predetermined hierarchical levels 286 (e.g., levels $286_1$–$286_6$). Merely as convention, higher-numbered levels are deemed sub-levels and, hence, hierarchically lower than lower-numbered levels. A user positions multiple node lines 288 (e.g., $288_1$–$288_{13}$) relative to each other and the hierarchical levels 286 depicted in level bar 284 to define a chart such as chart 50. In this example, outline-based definition 282 depicted in FIG. 11 corresponds to the hierarchical graphical listings of chart 50 depicted in FIG. 2.

Definition 282 is outline-based in that relationships between hierarchically related nodes 52 in chart 50 are established automatically between any preceding node line (e.g., $288_9$) and any subsequent node line (e.g., $288_{12}$) that is not of a hierarchical higher level than the preceding node line or for which there is no intervening node line of a higher level. By convention, subsequent node lines are listed after or below preceding ones in the orientation of chart manager component 266. In one implementation, chart manager user interface 280 supports both cut and paste function and drag and drop function by which a user can rearrange or move node lines 288, either singly or in groups.

For example, a user establishes outline-based definition 282 within chart manager user interface 280 by dragging and dropping node lines 288 into alignment with hierarchically related node lines and levels 286 to represent a desired hierarchical relationship. The user then names each node line 288 and associates desired actions such as those in Table 1 with appropriate node lines. Through the graphical user interface provided by chart manager 266, therefore, a user can combine the power of a wide variety of actions with the conceptual clarity and associations provided by a hierarchical graphical listing.

One aspect of chart manager user interface 280 is the automatic generation of null node lines 290 to fix or hold multi-level steps between immediately adjacent nodes 52 in a directly related hierarchical graphical listing. A null node (e.g., null nodes $290_1$ and $290_2$) is installed automatically by chart manager 266 for each additional level between a preceding node line (e.g., node line $288_1$) and a subsequent node line (e.g., node line $288_2$). For example, chart manager 266 installs null nodes 290 as the user "drags" or otherwise positions the subsequent node line below the next subsequent level below the preceding node line.

Null nodes 290 correspond to locations 292 in chart 50 of FIG. 2. Null nodes 290 do not represent actual hierarchical components of chart 50 and are not rendered as nodes within it. Rather, null nodes 290 allow chart manager 266 to position groups of nodes at different hierarchical levels that correspond to the actual hierarchical relationships to be represented. For example, node $52_2$ corresponds to a level $86_4$ that is two levels below level $286_1$ of node $52_1$. Null nodes $290_1$ and $290_2$ function, therefore, as placeholders that allow chart 50 to be rendered with virtually arbitrary hierarchical relationships between its nodes 52.

In accordance with the outline-based definition 282 of chart 50, chart manager 266 establishes a chart definition file with a record or data structure for each node 52. The record for each node 52, or node definition record, includes fields as set forth in Table 4.

TABLE 4

| Field | Description |
|---|---|
| Chart Id | This identifies the chart to which the node belongs. |
| Node Code | A code that identifies this node. |
| Node Name | A descriptive name that is displayed on the node when it is drawn. |
| Node Level | The chart level at which the node resides. |
| Parent Node Codes | Codes for all the nodes to which this node is a child. |
| Other Node Information | Nodes may have additional information such as an icon bitmap, a picture, an action or other properties depending on the type of chart and the desired characteristics of the particular node. |

The Chart Id field identifies the chart to which the node belongs and thereby correlates the record for a particular node with a particular chart. The Chart Id is useful in the general situation when the chart definition file contains definitions for more than one chart. The Node Code field identifies each node and may be a numeric indicator assigned to the node when it is defined. The Node Code for a node need be unique just as to other nodes having the same immediate parent node, thereby simplifying the avoidance of duplicate node codes. A user may choose to use complete uniqueness among all nodes. The Node Name is the descriptive name that is displayed on the node when it is drawn or rendered. In FIG. 2, for example, the nodes have the generic names "Node 1," Node 2," etc.

The Node Level indicates the hierarchical level at which the node is positioned. In FIG. 10, for example, one of the six levels 86 is assigned to each node. The Parent Node Codes are a listing of all Node Codes for the nodes to which the particular node is a child (i.e., all nodes that are in a direct line of hierarchically higher levels). The Other Node Information is an open field in which various types of information may be held including links to an icon bitmap, a picture, an action or other properties. It will be appreciated that the Chart Ids, Node Codes, Node Levels, and Parent Node Codes contain the data structure for defining the relationships between the nodes of a hierarchical graphical listing according to the present invention.

Figure 12:
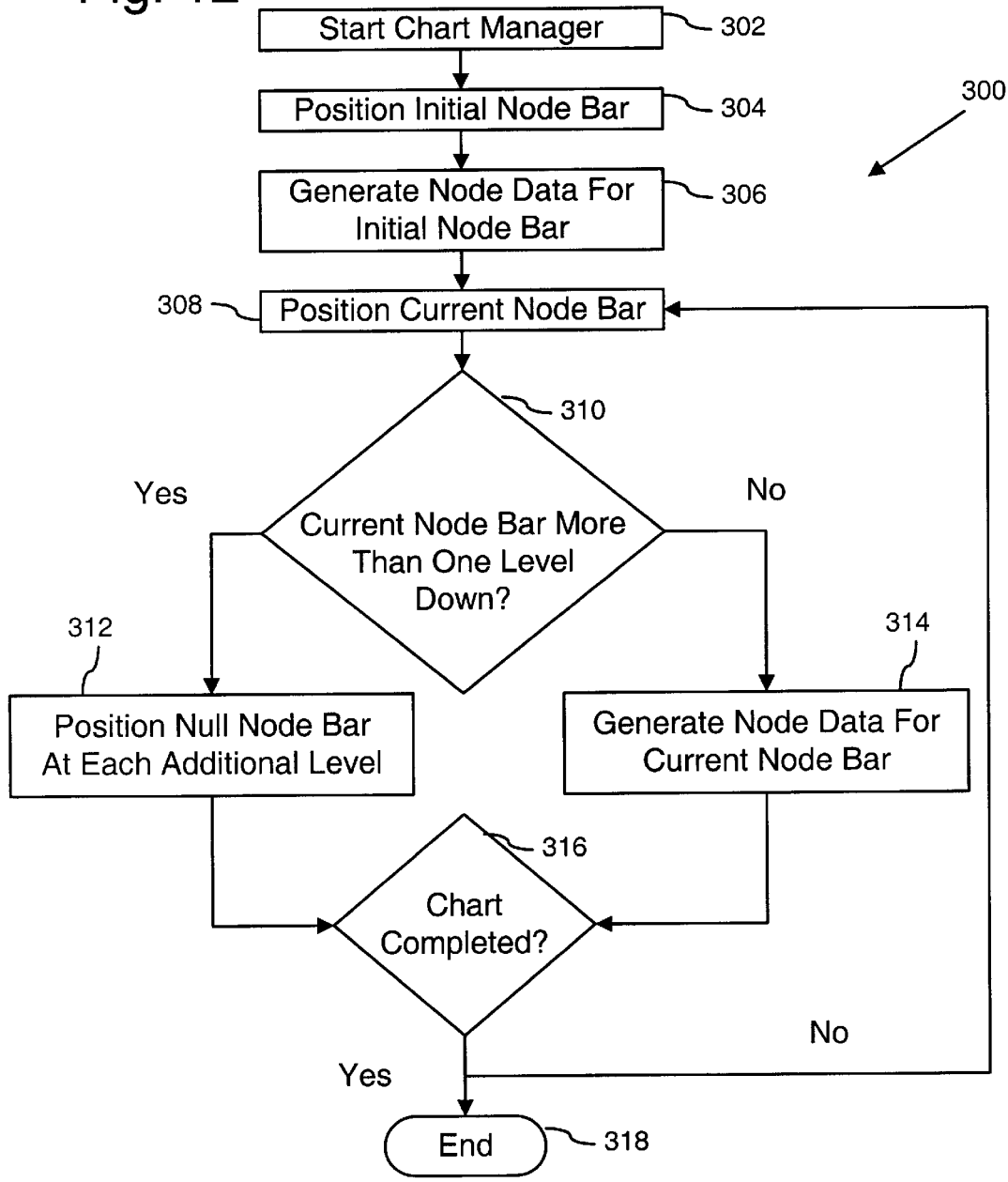
FIG. 12 is a flow diagram of a chart manager process illustrating the operation of the chart manager component.

FIG. 12 is a flow diagram of a chart manager process 300 illustrating the operation of chart manager 266. Process 300 begins with process block 302, which indicates that chart manager 266 with its user interface 280 activated. User interface 280 includes a source of node lines 288 as described above. The following description refers to nodes 52 and node lines 288 interchangeably.

Process block 304 indicates that a user positions an initial node line 288 to represent a top-level node 52 of a set of nodes in a chart or hierarchical graphical listing.

Process block 306 indicates that chart manager 266 assigns or generates node data for the corresponding node 52. The node data may include the data fields described above with reference to Table 4 and may be generated automatically by software 260 or in accordance with selections entered or made by the user.

Process block 308 indicates that a user positions a current node line 288 to represent another node 52 in the set of nodes in the hierarchical graphical listing.

Query block 310 represents a query as to whether the current node line is positioned by the user more than one level below its immediate parent node line. Whenever the current node line is positioned more than one level below its immediate parent node line, query block 310 proceeds to process block 312. Otherwise query block 310 proceeds to process block 314.

Process block 312 indicates that a null node 290 is positioned at each level between the current node line and its immediate parent node line.

Process block 314 indicates that chart manager 266 assigns or generates node data for the node corresponding to the current node line. The node data may include the data fields described above with reference to Table 4 and may be generated automatically by software 260 or in accordance with selections entered or made by the user.

Query block 316 represents a query as to whether the user has completed defining the chart. The user may indicate that defining of the chart is completed by entering a particular command (e.g., activating a graphical SAVE button) or by closing chart manager 260. The user may indicate that defining of the chart is not yet complete by selecting another bar node for positioning to represent another node in the chart. Whenever the user has not yet completed defining the chart, query block 316 returns to process block 308 for processing a new current node line. Otherwise query block 316 proceeds to end block 318.

The generation of chart definition files is described with reference to use of chart manager 266 by a user. It will be appreciated, however, that chart definition files may be generated by programmed operation of a computer with reference to predetermined data files. Once a chart definition file is established, computer software of the present invention is able to draw or render a corresponding chart such as chart 50 in FIG. 2. As described in greater detail below, the chart represented by a chart definition file may be rendered in a number of selected formats including the vertical chart format FIG. 2.

Figure 13A:
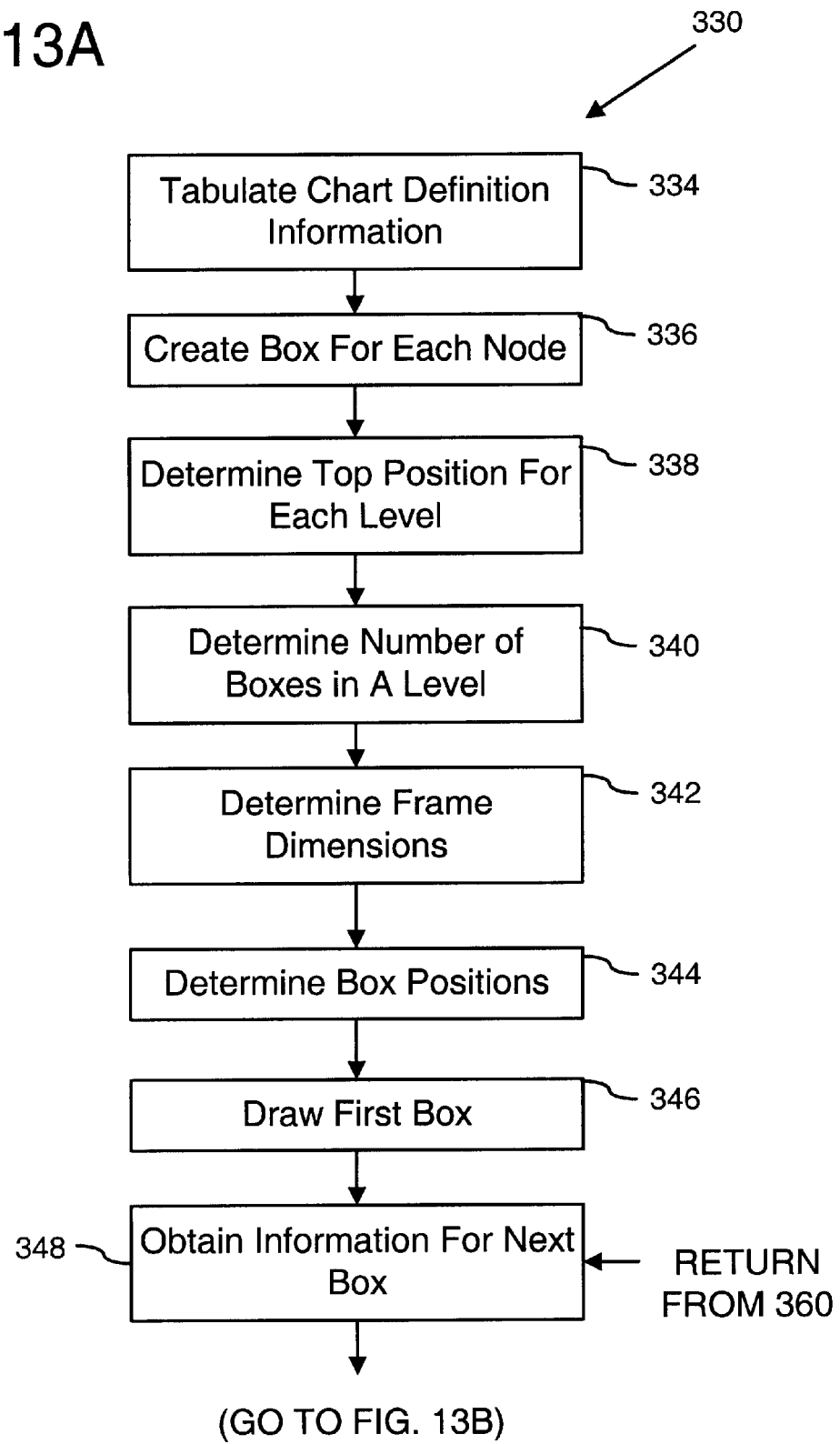
FIGS. 13A and 13B are a flow diagram of a chart drawing process for drawing or rendering a hierarchical graphical listing or chart.
Figure 13B:
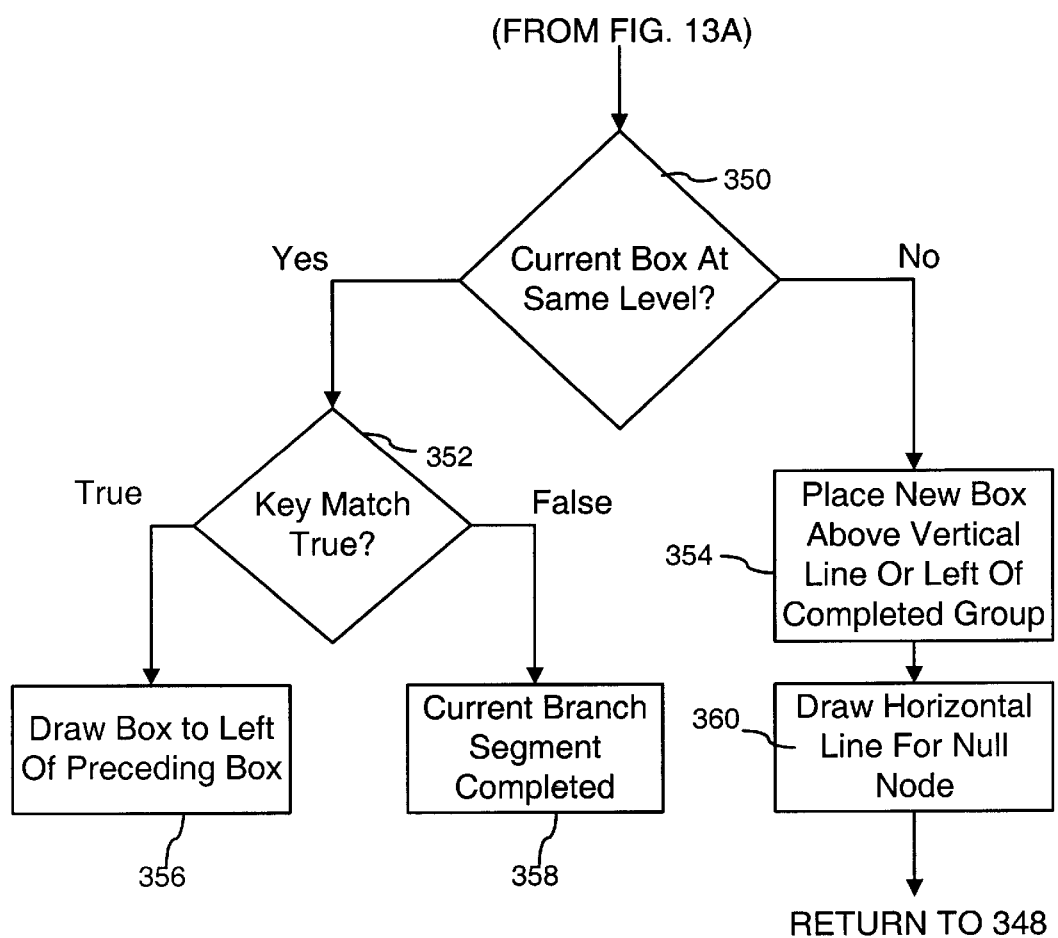

FIGS. 13A and 13B are a flow diagram of a chart drawing process 330 illustrating operation of chart renderer 262 in drawing or rendering a vertical chart format a chart such as chart 50 of FIG. 2. In accordance with aspects of this invention the vertical chart format of chart 50 is one of several chart formats selectable by a user, as described below in greater detail. Accordingly, many steps in chart drawing process 330 are applicable to the rendering or drawing of charts in other formats.

The chart is built using basic graphic objects such as lines, boxes and frames. These can be either drawn using programmed routines or they can be standard objects provided with languages such as Visual C++, Visual Basic, Delphi and others. A frame is the display area (e.g., frame 332 in FIG. 2) within which the chart is drawn. The frame has a vertical height and horizontal width that are adjustable to accommodate the chart to be drawn. For some charts the frame is capable of displaying a background picture.

Boxes represent chart nodes such as nodes 52 in FIG. 2. The height and width of the boxes are adjustable to accommodate the style of chart being drawn. The box can also display the text of the node name and in some chart formats a small bitmap or icon picture. Lines are used to connect the nodes and show the relationships between them.

Process block 334 indicates that chart definition information is tabulated to organize the information for rendering the chart. In one implementation, the chart definition information is used to build two tables: a Chart Level Table and a Node Properties Table. The Chart Level Table holds control information for each chart level and includes fields listed in Table 5. The Node Properties Table holds information on each node in the chart and includes the fields listed in Table 6.

TABLE 5

| Field | Description |
| --- | --- |
| Number | Number of nodes at each chart level |
| Box Top Position | The vertical location of nodes at this chart level. (used to draw vertical format charts) |
| Box Left Position | The horizontal screen location of nodes at this chart level. (used to draw horizontal charts, which are described below) |

TABLE 6

| Field | Description |
| --- | --- |
| Node Name | See Table 4 |
| Node Level | See Table 4 |
| Node Top | Location of node on the screen. (used to draw pictorial charts, which are described below) |
| Node Left | Location of node on the screen. (used to draw pictorial charts, which are described below) |
| Node Record Number | File location for looking up additional node information |
| Key Match | Indicates whether this node is the last one on this chart branch |

As the node definition records are read during tabulation of the chart definition information, the parent node codes of the current node are compared with those of the previous node and Key Match indicator is set if they are the same. For a current or given node (e.g., node $52_{12}$), a parent node is that node (e.g., node $52_9$) which is at a hierarchically higher level and to which the current node is connected or belongs. A child node is a node (e.g., node $52_{12}$) that is at a hierarchically lower level and that is connected or belongs to the current node (e.g., node $52_9$). Immediate children are child nodes (e.g., nodes $52_6$, $52_7$, $52_8$) that are immediately below a parent node (e.g., node $52_5$).

Process block 336 indicates that a box is created to represent each node. Each box is assigned a sequential number that will be used to access the Node Properties Table when a user selects that node, by clicking it with a mouse or using some other selection method.

Process block 338 indicates that the Box Top Position for each level is determined. The Chart Level Table is scanned or parsed and the Box Top Position for each level is computed for the boxes that will be drawn at that level.

Process block 340 indicates that the number of boxes that will be placed across the chart is determined by parsing the Node Properties Table and counting the number of places Key Match is false.

Process block 342 indicates that dimensions are determined for the frame within which the chart is to be rendered (e.g., frame 332). The determination is made by using the number of levels in the chart, the height of a box, and the vertical gap between boxes to compute the height and by using the number of boxes that will be placed across the chart, the width of a box, and the horizontal gap between boxes to determine the width.

Process block 344 indicates that the positions of the boxes in the frame are determined, starting at the lower right-hand corner. This is done by starting at the end of the Node Properties Table (the bottom of the chart) and stepping up through the table.

Process block 346 indicates that the first box is drawn or placed in the right-most position in the frame, and based on the node's chart level, its Box Top Position is taken from the Chart Level Table.

Process block 348 indicates that the Node Properties Table information for the next box is obtained.

Query block 350 represents a query as to whether the current box or node is at the same level as the previous one. If the current box or node is at the same level as the previous one, query block 350 proceeds to query block 352. If the current box or node is not at the same level as the previous one, query block proceeds to process block 354.

Query block 352 represents a query as to whether the Key Match of the current box or node is true. If the Key Match of the current box or node is true, query block 352 proceeds to process block 356. If the Key Match of the current box or node is false, query block proceeds to process block 358.

Process block 356 indicates that the box is placed or drawn to the left of the preceding box. As each box is placed, a short vertical line (equal to half the distance of the vertical gap between boxes) is drawn upward from the center to the top of the box.

Process block 358 indicates that the current branch segment is completed, which includes drawing a horizontal line connecting the vertical lines extending from the box tops (in some cases a vertical line projecting from the top of a horizontal line will be connected). In addition, a vertical line equal to half the vertical gap distance is drawn up from the center to the horizontal line.

Process block 354 indicates that the box for the new node is placed either above the new vertical line, if it is the parent node of the current branch, or to the left of the just completed node group if it belongs to another branch.

Process block 360 indicates that a horizontal line is drawn instead of a box whenever a null node is encountered. Process block 360 returns to process block 348.

Chart drawing process 330 draws or renders a vertical format chart according to the present invention. Some charts, however, will be so large because of the numbers of nodes or levels that the complete charts cannot be readily displayed entirely at one time. Partial chart display addresses this problem by displaying a reduced number of levels at a time (e.g., two or three levels rather than the six or more of an exemplary complete chart).

For example, if only three levels are to be displayed at a time, only the top three levels would be displayed when the chart is first drawn. When a node within the displayed area of the chart is selected by a user, that node and two levels of its child nodes will be drawn and replace the initial chart display. This process can be continued to move down through hierarchically lower levels of the chart. To move back up the chart, the top-most node of those displayed would be selected and the parent node and two levels of its child nodes are drawn.

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

What is claimed is:

1. A method of retrieving information from a database record having plural fields, comprising:

rendering on a display screen plural successive integrated active information documents, each having one or more action control elements integrated into information in the document;

obtaining control element selections of particular action control elements in the plural successive integrated active information documents, one or more of the action control elements corresponding to one or more fields of the database record; and forming a database query according to the action control element selections, whereby the information in subsequent ones of the successive intergrated active information documents corresponds to control element selections made from preceding ones of the intergrated active information documents.

2. The method of claim 1 further comprising rendering a selection panel that indicates previous control element selections and revising a particular preceding action control element selection by accessing only that selection.

3. The method of claim 1 in which each of one or more of the action control elements further include one of plural actions in addition to correspondence to one or more fields of the database record.

4. The method of claim 3 in which the plural actions include plural ones of a display action, a view/play action, and an editing action.

5. The method of claim 3 in which one of the plural actions includes displaying a designated hierarchical graphical listing.

6. The method of claim 3 in which the display action includes displaying a designated active form with first and second different types of action control elements.

7. The method of claim 6 in which the first type of action control element is a row of information in an information table of plural rows.

8. The method of claim 1 in which the integrated active information documents include at least one hierarchical graphical listing having plural nodes at plural levels, the nodes corresponding to the action control elements.

9. The method of claim 1 in which the integrated active information documents include at least one active form with first and second different types of action control element.

10. The method of claim 1 in which the integrated active information documents include at least one spreadsheet having an action control element.

11. The method of claim 1 in which the database query is an SQL statement.

12. A computer readable medium having thereon software instructions for retrieving information from a database record having plural fields, comprising:

software instructions for rendering plural successive integrated active information documents, each having one or more action control elements integrated into information in the document;

software instructions for obtaining control element selections of particular control elements in the plural successive integrated active information documents, one or more of the action control elements corresponding to one or more fields of the database record; and software instructions for forming a database query according to the action control element selections, whereby the information in subsequent ones of the successive integrated active information documents corresponds to control element selections made from preceding ones of the integrated active information documents.

13. The medium of claim 12 further comprising the integrated active information documents and in which the documents include at least one hierarchical graphical listing having plural nodes at plural levels, the nodes corresponding to the action control elements.

14. The medium of claim 12 further comprising the integrated active information documents and in which the documents include at least one active form with first and second different types of action control element.

15. The medium of claim 14 in which the first type of action control element is a row of information in an information table of plural rows.

16. The medium of claim 12 further comprising the integrated active information documents and in which the documents include at least one spreadsheet having an action control element.

* * * * *